United States Patent [19]

Maeda

[11] 3,902,830

[45] Sept. 2, 1975

[54] SIDE SEAL MEANS FOR USE IN ROTARY PISTON INTERNAL COMBUSTION ENGINE

[75] Inventor: Toshiyuki Maeda, Ageo, Japan

[73] Assignee: Nippon Piston Ring Co., Ltd., Tokyo, Japan

[22] Filed: Feb. 21, 1973

[21] Appl. No.: 334,314

[30] Foreign Application Priority Data

Feb. 21, 1972 Japan.................. 47-22009

[52] U.S. Cl................. 418/142; 418/178
[51] Int. Cl.² ....................... F04C 27/00
[58] Field of Search............ 418/142, 178, 117; 277/144

[56] References Cited
UNITED STATES PATENTS

| | | | |
|---|---|---|---|
| 3,044,687 | 7/1962 | Davey | 418/178 |
| 3,059,584 | 10/1962 | Cottell | 418/142 |
| 3,528,757 | 9/1970 | Ware | 418/178 X |
| 3,575,537 | 4/1971 | Yamamoto | 418/178 X |
| 3,575,541 | 4/1971 | Hamada | 418/142 |
| 3,658,451 | 4/1972 | Gomada | 418/178 |

FOREIGN PATENTS OR APPLICATIONS

| | | | |
|---|---|---|---|
| 1,334,159 | 6/1963 | France | 418/142 |
| 1,016,540 | 1/1966 | United Kingdom | 418/142 |

*Primary Examiner*—C. J. Husar
*Assistant Examiner*—Leonard Smith
*Attorney, Agent, or Firm*—Sughrue, Rothwell, Mion, Zinn and Macpeak

[57] ABSTRACT

A side seal means for use in a rotary piston internal combustion engine comprises an inner side seal mounted in an inner side seal groove provided on the side face of the rotor of the engine along the side edge thereof and an outer side seal mounted in an outer side seal groove provided on said side face outside said inner side seal groove and parallel thereto. The inner side seal made of steel is provided with a hardened layer at least on the sliding surface thereof, and the outer side seal made of steel is provided with chrome plate at least on the sliding surface thereof.

3 Claims, 5 Drawing Figures

PATENTED SEP 2 1975  3,902,830

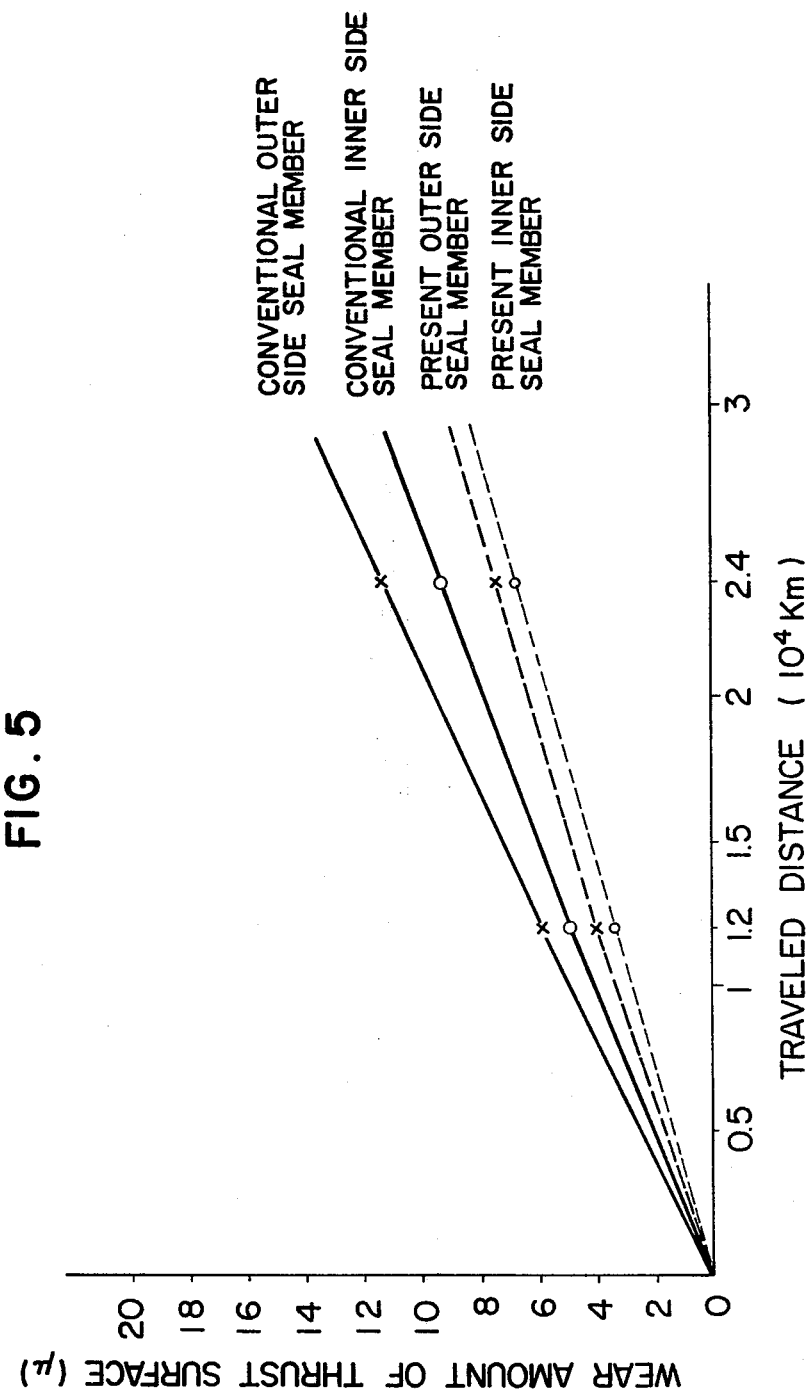

SIDE SEAL MEANS FOR USE IN ROTARY PISTON INTERNAL COMBUSTION ENGINE

BACKGROUND OF THE INVENTION

1. Field of the Invention

This invention relates to a side seal means for use in a rotary piston internal combustion engine.

2. Description of the Prior Art

It has been known in the art to provide a side seal means on the side faces of a rotor of a rotary piston internal combustion engine in order to prevent a combustion gas in the combustion chamber from leaking out. The side seal means plays a significant role in the rotary piston internal combustion engine, since not only the output is lowered but also an oil seal means provided inside the side seal means is affected by the combustion gas leaking out of the combustion chamber in the case where the side seal means does not operate in good condition.

In view of the significant role of the side seal means in the rotary piston internal combustion engine, active research and development have been conducted for improving the side seal. Despite such research and development, a side seal means which has a long effect of sufficient seal has not been developed yet in practice.

SUMMARY OF THE INVENTION

In light of the above described situation in the development of the side seal means for a rotary piston internal combustion engine, the primary object of the present invention is to provide a side seal means which has sufficient seal.

Another object of the present invention is to provide a side seal means performing sufficient sealing effect for a long time.

Other objects, features and advantages of the present invention will become apparent from the following detailed description of preferred embodiments thereof taken in conjunction with the accompanying drawings.

BRIEF DESCRIPTION OF THE DRAWINGS

FIG. 5 is a graph showing the comparision of an amount of wear in each sliding surface of conventional side seals and the present side seals.

DETAILED DESCRIPTION OF THE INVENTION

Figure 1:
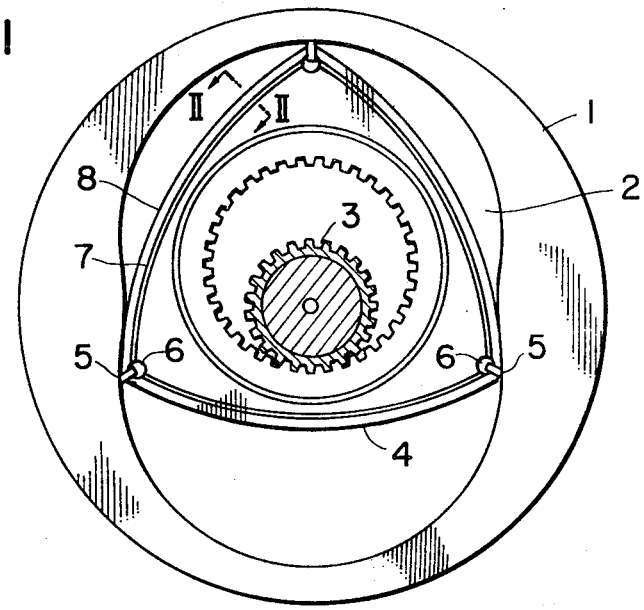
FIG. 1 is a cross sectional side view of a rotary piston internal combustion engine in which the side seal means in accordance with an embodiment of the present invention is equipped therewith.

Reference is now made to FIG. 1, the reference numeral 1 indicates a center housing of a rotary piston internal combustion engine, 2 indicates a side housing of the engine, 3 shows an eccentric shaft extending through the side housing 2, and 4 designates a rotor rotatably mounted on the eccentric shaft 3 which eccentrically rotates in a casing defined by the center housing 1 and side housing 2. The reference numeral 5 indicates an apex seal provided at each apex of the rotor 4 and a pair of corner seals 6 which support the opposite ends of the apex seal 5. 7 shows an inner side seal groove extending along the side edge of the rotor 4 on the side end face thereof between the adjacent corner seals 6 and 6, and 8 shows an outer side seal groove extending outside the inner side seal groove 7 and parallel thereto on the side end face of the rotor 4. The construction of the side seal grooves 7 and 8 and side seals is clearly shown in FIG. 2.

Figure 2:
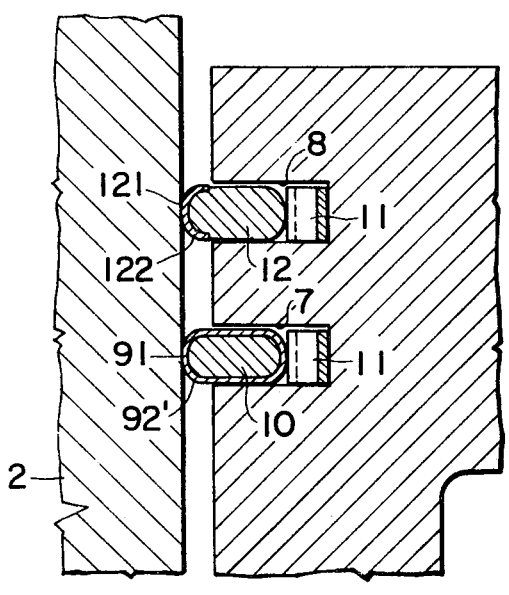
FIG. 2 is an enlarged partial sectional view taken along the line II—II in the FIG. 1.

Referring to FIG. 2, an inner side seal 10 made of steel which has a hardened layer 92 formed by heat treatment, i.e. quenching and tempering, at least on the sliding surface 91 thereof, is inserted into the inner side seal groove 7 together with a spring 11. An outer side seal 12, made of steel having a chrome plate part 122 on the sliding surface thereof 121 is inserted into the inner side seal groove 8 together with a spring 11.

Since the outer side seal 12 which is subject to a severe usage condition by first sealing the combustion gas is provided with the chrome plate on the sliding surface thereof, sufficient wear resistance required for the sliding surface of the side seal is obtained. Further, scuffing is also prevented owing to the chrome plate 122. The inner side seal 10 having a usage condition which is not so severe as the outer side seal 12 is provided with a hardened layer 92 on the sliding surface thereof. Since the inner and outer side seals 10 and 12 are provided with the particularly treated portions which are so treated that the hardness thereof may satisfy the respective requirements depending on the severeness of usage condition, the amount of wear of the inner and outer side seals 10 and 12 always becomes substantially the same. Therefore, the inner and outer side seals constantly perform the same function and have the same degree of seal effect means for a long time. Thus, the performance of the rotary piston internal combustion engine is markedly enhanced.

Figure 3:
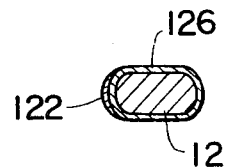
FIG. 3 is an enlarged sectional view of an outer side seal according to another embodiment of the invention.
Figure 4:
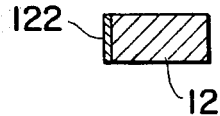
FIG. 4 is an enlarged sectional view showing the shape of the outer or inner side seal according to another embodiment of the present invention, in which the reference numerals are indicated with particular reference to the outer side seal shown in FIG. 3.

It will be understood that the outer side seal 12 may be provided with a hardened layer 126 over the whole surface thereof as shown in FIG. 3. The performance of the seal 12 is further improved by the enhanced wear resistance obtained by provision of the hardened layer 126. Further, it will readily by understood that the shape of the cross section of inner and outer side seals 10 and 12 which has been described or illustrated as oval shape in FIG. 2 may be rectangular as shown in FIG. 4 in view of the spirit of the present invention.

In order to attest to the superiority of side seal means according to the present invention, the inventor of the present invention made tests described in the following Example.

EXAMPLE

It is the aim of the following tests to compare an amount of wear of the sliding surface of a conventional side seal with that of the present side seal when both side seals were equipped with a rotary piston internal combustion engine, respectively, and then the engine was operated continuously for 200 hours.

The details of test pieces of both side seals and the engine used and the condition for operating the engine were as follows:

The Test Piece of the Conventional Side Seals

Both the inner and outer side seals were made of cast iron in which each sliding surface thereof had the hardness of HMV440.

The Test Piece of the present Side Seal Means

Both the inner and outer side seals were made of S.K. Steel which were provided with quenching at 850°C for 5 minutes and with tempering at 350°C for 60 minutes thereafter, whereby the whole surface of each side seal was formed in a quenching hardened layer in which the layer had the hardness of HMV650. And then, the sliding surface of the outer side seal was provided with chrome plating. Thus, the resultant sliding surface of the outer side seal had the hardness of HMV1050.

| THE ENGINE USED | |
| --- | --- |
| Type: | MAZDA M10A type |
| Total Exhaust Volume : | 491 × 2(rotors) |
| Maximum Output : | 105(PS)/ 7000 (rpm) |
| Maximum Torque : | 13.7(kg.m)/3500(rpm) |
| THE CONDITIONS FOR OPERATING THE ENGINE | |
| The number of revolutions: | 4290(rpm) |
| Boost pressure : | −200mm Hg. |
| Running Speed : | 120 km/h. |

The comparision of resultant amount of wear ($\mu$) in each sliding surface of the conventional side seals and the present side seals is as shown in FIG. 5.

As clearly understood from the FIG. 5, with respect to the amount of wear of the sliding surface, both present inner and outer side seals have a little amount as compared with the conventional inner and outer side seals, respectively. Moreover, the difference of the amount of wear of the sliding surface between the inner and outer side seals of the present invention is smaller than that of the conventional side seals.

What is claimed is:

1. In a side seal arrangement for use in a rotary piston internal combustion engine including two radially spaced inner side seal grooves provided on the side face of the rotor of the engine along the side edge thereof with an inner side seal mounted in the radially inner side seal groove and an outer side seal mounted in the radially outer side seal groove with the side seals being generally parallel, the improvement comprising said outer side seal being made of steel and being chrome plated at least on the sliding surface thereof, and said inner side seal being made of steel and being provided with a hardened layer at least on the sliding surface thereof with said layer on said sliding surface being hardened to a degree such that said inner and outer side seals have substantially equal wear rates during engine operation.

2. A side arrangement means for use in a rotary internal combustion engine as defined in claim 1 wherein said outer side seal is provided with two layers on the peripheral surface thereof, one of the layers comprising a hardened layer provided at least on the surface excluding said sliding surface thereof and the other layer comprising said chrome plate provided at least on said sliding surface thereof.

3. A side seal means for use in a rotary internal combustion engine as defined in claim 1 wherein said inner side seal is covered with the hardened layer over the whole surface thereof.

* * * * *